UNITED STATES PATENT OFFICE.

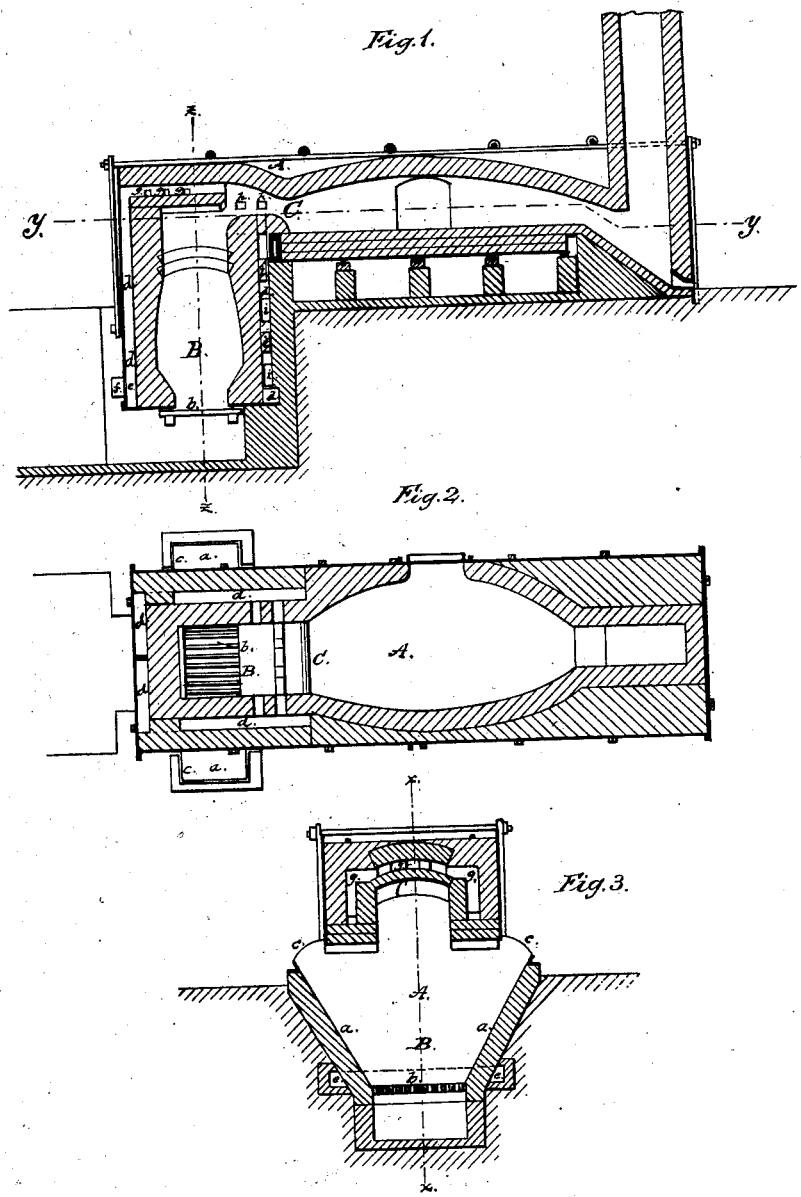

HENNING BOETIUS, OF HANOVER, PRUSSIA.

IMPROVEMENT IN THE CONSTRUCTION OF METALLURGIC AND OTHER FURNACES.

Specification forming part of Letters Patent No. 69,963, dated October 22, 1867.

*To all whom it may concern:*

Be it known that I, HENNING BOETIUS, of the city of Hanover, Kingdom of Prussia, have invented new and useful Improvements in Furnaces; and I do hereby declare that the following is a full, clear, and exact description thereof, which will enable others skilled in the art to make and use the same, reference being had to the accompanying drawings, forming part of this specification, in which—

Figure 1 is a longitudinal vertical section of a heating-furnace constructed on my improved plan, the plane of section being indicated by the line $x\,x$, Fig. 3. Fig. 2 is a horizontal section of the same, the plane of section being indicated by the line $y\,y$, Fig. 1. Fig. 3 is a vertical cross-section of the same, the plane of section being indicated by the line $z\,z$, Fig. 1.

Similar letters of reference indicate like parts.

This invention relates to a novel construction of furnaces to be used in the manufacture of glass, iron, steel, and other materials, as well as for all purposes where heat is to be produced.

The invention consists in the use of flues, which are arranged on the outside of the walls of the fire-places, and connect with channels or air-passages arranged above the fire-chamber, said flues being provided with valves or gates to regulate the quantity of the air passing through the same.

The object of this invention is to keep the bed of the furnace and the side walls of the fire-places cool, and to preserve the same from the destructive effects of the heat for as long a period of time as possible.

The air passing from the outside of the walls of the fire-chamber is heated before it is mixed with the combustible gases, and effects a most complete combustion of the latter as soon as it comes in contact with the same in the furnace.

A represents a heating-furnace provided with one fire-place, B, which has two inclined side walls, $a\,a$, built of fire-proof material, and is provided with a level or inclined grate, $b$, as shown in the drawings. The fuel is placed into the furnace through the opening $c\,c$ at the upper end of the inclined walls, and gradually moves down toward the grate. The walls $a\,a$ should be more or less inclined, according to the nature of the fuel employed.

Around the outside of the walls of the chamber are provided flues $d\,d$, the lower ends of which communicate with an opening or openings, $e$, in the foundation or outer wall of the furnace, which opening or openings can be more or less closed by a gate or valve or valves, $f$, so as to let a greater or less amount of air into the flues.

The flues $d\,d$ communicate at the top of the furnace with a number of channels, $g\,g$ and $h\,h$, through which the air, ascending in the flues, is conducted to the mixing-chamber C, where it mingles with the gases arising from the fire in the grate. As the air, during its passage through the flues $d\,d$ and channels $g$ and $h$, has become heated, the complete combustion of the combustible gases with which it is mixed is made certain.

The construction of the parts is, of course, liable to extensions, according to the form of furnaces, the quality and nature of the fuel employed, &c. So, for instance, two fire-places may be used in place of one, with one or two openings for the fuel to each grate, or circular furnaces may be used, &c.

For puddling, glass, or heating furnaces of every description, as well as for heating boilers, &c., my invention may be used with advantage.

In all cases the fire is regulated by the stoker, who keeps the grate more or less free from clinkers, and who admits more or less air through the valve or valves $f$.

For more completely heating the air in the flues, stops $i\,i$ may be arranged therein, whereby the air is detained and brought in contact with larger heating-surfaces.

When two or more fire-places are employed, the walls between the same may be provided with such flues.

Having thus described my invention, what I claim as new, and desire to secure by Letters Patent, is—

Providing furnaces which are to be used in the manufacture of glass, iron, steel, and other metals and substances, and for other purposes, with a series of flues, $d\,d$, arranged around the outer walls of the fire-place, or in the walls between the fire-places, for the purpose of conveying air to the combustible gases evolved from the fuel, said flues being provided with a valve or valves, $f$, all as herein shown and described, and for the purposes set forth.

HENNING BOETIUS.

Witnesses:
WILH. GROTE,
JOHN F. BOETIUS.